United States Patent [19]

Back

[11] Patent Number: 5,216,508

[45] Date of Patent: Jun. 1, 1993

[54] WIDE-BAND CATHODE-RAY TUBE DRIVING CIRCUIT

[75] Inventor: Dong-cherl Back, Suwon, Rep. of Korea

[73] Assignee: SamSung Electronics Co., Ltd., Suwon, Rep. of Korea

[21] Appl. No.: 733,594

[22] Filed: Jul. 22, 1991

[30] Foreign Application Priority Data

Jan. 17, 1991 [KR] Rep. of Korea ............... 91-736

[51] Int. Cl.$^5$ ............................................. H04N 5/57
[52] U.S. Cl. ................................. 358/168; 358/169; 358/39; 358/40; 358/30; 358/31
[58] Field of Search ............... 358/168, 169, 39, 40, 358/31, 30, 64, 65, 172, 34, 37, 27

[56] References Cited

U.S. PATENT DOCUMENTS

| | | | |
|---|---|---|---|
| 3,619,486 | 11/1971 | Tzakis | 358/30 |
| 3,699,243 | 10/1972 | Dann | 358/35 |
| 3,996,609 | 12/1976 | Avery | 358/40 |
| 4,197,557 | 4/1980 | Tuma | 358/168 |
| 4,209,808 | 6/1980 | Harwood | 358/168 |
| 4,253,110 | 2/1981 | Harwood | 358/169 |
| 4,309,725 | 1/1982 | Groeneweg | 358/39 |
| 4,451,840 | 5/1984 | Shanley, II | 358/169 |
| 4,451,849 | 5/1984 | Fuhrer | 358/169 |
| 4,717,953 | 1/1988 | Chang | 358/168 |

*Primary Examiner*—James J. Groody
*Assistant Examiner*—Sherrie Hsia
*Attorney, Agent, or Firm*—Robert E. Bushnell

[57] ABSTRACT

A wide-band cathode-ray tube driving circuit is disclosed for increasing the high-frequency response characteristic and the band-width of an amplifier in a video signal processing system. The circuit comprises a color difference signal processor, a luminance signal processor, a cathode-ray tube, a differential amplification circuit for differentially amplifying a color difference signal and a luminance signal and supplying the amplified signals to the cathode-ray tube and a current control circuit for controlling the amount of current flow in the differential amplification circuit. Thus, an image of heightened picture quality can be displayed on the cathode-ray tube.

16 Claims, 2 Drawing Sheets

WIDE-BAND CATHODE-RAY TUBE DRIVING CIRCUIT

BACKGROUND OF THE INVENTION

The present invention relates generally to a cathode ray tube driving amplification circuit in a video signal processing system, and more particularly to a wide-band cathode-ray tube driving circuit for enlarging the driving bandwidth of the cathode-ray tube.

A cathode-ray tube (hereinafter, referred to as a CRT) can be an example of a typical image display apparatus. A CRT driving circuit in the CRT must increase the frequency bandwidth and high-frequency response characteristic of a video signal (or a composite video signal) which is supplied to the tube in order to make possible the improvement to the picture quality displayed thereon. The degree of improvement to picture quality is determined according to both the numbers of scanning lines on a CRT and pixels in each scanning line. Thus, the more the numbers, the more superior the picture quality can be displayed on the CRT.

In the video signal processing system of the standard type CRT having 525 scanning lines, therefore, the driving frequency bandwidth is 4.2 MHz as shown by the formula, that is, the frame scanning frequency (30 Hz)×the scanning line numbers (525)×the dot numbers (=266) =4.2 MHz. Accordingly, such standard type CRT driving amplification circuit can display standard video signals on the CRT without any degradation of picture quality if the circuit utilizes a frequency bandwidth of from 4 MHz to 5 MHz.

The conventional CRT driving circuit as shown in FIG. 1 has used a cascode amplifier mainly in a certain high-frequency circuit. The cascode amplifier comprises a common emitter transistor Q2 and a common base transistor Q1 serially coupled to each other.

First, a color difference signal R−Y demodulated and outputted from chrominance signal processor 10 is applied to the base of common emitter transistor Q2 of the driving amplifier 40, and a negative luminance signal (−Y) outputted from luminance signal processor 20 before which both the brightness and contrast are already controlled manually is also applied to the emitter of transistor Q2 via a resistor R5.

The transistor Q2, being of NPN type, inversely amplifies the color difference signal R−Y applied to the base thereof.

Hence, a signal of −(R−Y)+(−Y)=(−R) is high-frequency amplified and generated at a point A which is located at the collector of transistor Q2.

The signal output (−R) is applied to the emitter of common base transistor Q1 and amplified for output at the collector thereof, and the amplified output color signal (R) is applied to cathode image intensity control electrode 31 of CRT 30 via current limiting resistor R2.

In case of the afore-described cascode amplifier, there are difficulties due to amplification factor variance according to an ambient temperature (or direct current gain $h_{FE}$), drift due to forward biased junction voltage $V_{BE}$ and the fluctuation of backward saturation current $I_{CBO}$. Furthermore, any change in the amplification factor, the forward biased junction voltage or the backward saturation current varies the output voltage.

Such varied output voltage value is indistinguishable from that which is caused by a change in the input signal voltage, resulting in causing such problems that diminish the stability factor. When a cascode type amplifier is used, however, the video-frequency bandwidth which the CRT driving circuit can cover is approximately 4 to 5 MHz, which is sufficient for use within the general video signal processing system.

Recently, apparatuses that remarkably increase the number of scanning lines or pixels are being developed which display an image of heightened picture quality. For example, there are HD(High Definition)TV, ID-(Improved Definition)TV and ED(Enhanced Definition)TV. The afore-mentioned CRT driving circuit utilized in the above exemplified apparatuses require a wide-band CRT driving amplification circuit having a frequency band of approximately from 8 to 20 MHz. Accordingly, when the afore-mentioned cascode type amplifier is used, the problem of not being able to display an image of heightened picture quality arises.

SUMMARY OF THE INVENTION

To solve the above problems, it is an object of the present invention to provide a wide-band cathode-ray tube driving circuit for increasing high-frequency response and wide frequency bandwidth by using a differential amplifier in a video signal processing system.

To accomplish the above object, there is provided a wide-band cathode-ray tube driving circuit utilized in a video signal processing system having a color difference signal processor for generating a color difference signal, a luminance signal processor for generating a luminance signal and a cathode-ray tube, the circuit comprising: differential amplification means for differentially amplifying both the luminance signal and the color difference signal to supply the differentially amplified signals to the cathode-ray tube; and current control means for controlling the amount of current flow in the current flow path of the differential amplification means.

DETAILED DESCRIPTION OF THE PREFERRED EMBODIMENT

The aforesaid object and other objects, features, aspects and advantages of the present invention will become more apparent from the following detailed description of the present invention when taken in conjunction with the accompanying drawings.

Now, a detailed description of one preferred embodiment will be given to the present invention with reference to FIG. 2.

Figure 2:
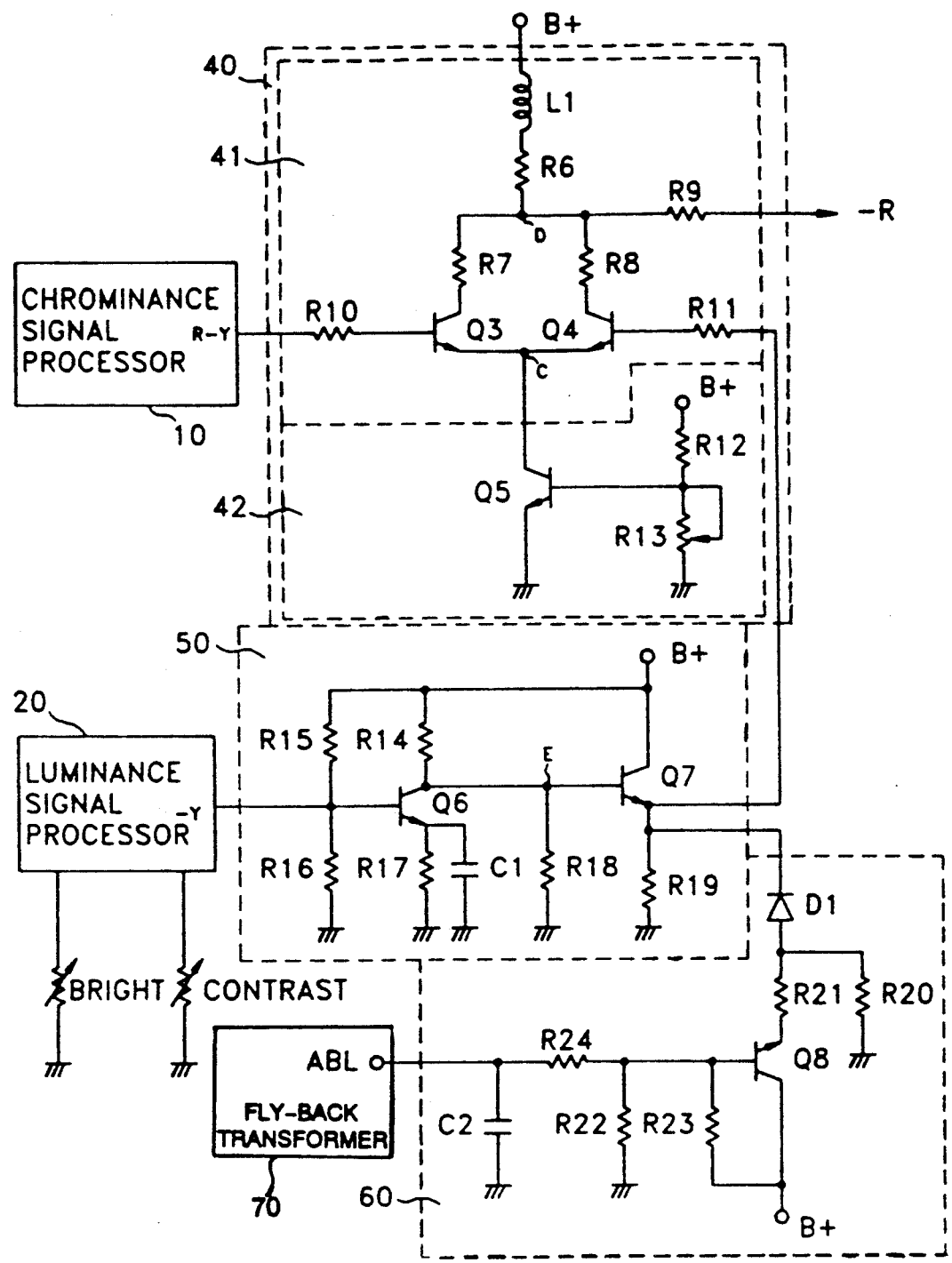
FIG. 2 schematically shows a wide-band cathode-ray tube driving circuit according to the present invention.

In FIG. 2, both color difference signal processor 10 and luminance signal processor 20 are similar in construction to those in the public domain.

Driving amplifier 40 comprises differential amplification means 41 comprising two transistors Q3 and Q4 and current control means 42 comprising a common emitter transistor Q5 of which the collector is connected to a junction C of the common-coupled emitters of the respective transistors Q3 and Q4.

Especially, differential amplification means 41 is composed in such a manner that the base of transistor Q3 is connected to output terminal R−Y of color difference signal processor 10 via resistor R10, and both the collectors of the respective transistor Q3 and Q4 are connected to supply voltage B+ via collector resistors R7 and R8 respectively and junction D, and inductor L1 and resistor R6 are connected in series between junction D and supply voltage B+, and junction D is also connected to the cathode terminal 31 of a cathode-ray tube via a resistor R9.

Current control means 42 comprises resistor R12 and variable resistor R13 serially connected between supply voltage B+ and ground potential GND, and transistor Q5 of which the base is connected to a junction between resistor R12 and variable resistor R13.

Buffer 50 comprises a common emitter transistor Q5 and a common collector transistor Q7 connected in cascade between luminance signal processor 20 and driving amplifier 40.

In the emitter transistor Q6, there are two bias resistors R15 and R16, connected to the base thereof, supply voltage B+ is supplied to the collector via a resistor R14, and the emitter output thereof also connected to the ground potential GND via resistor R17 and a capacitor C1 that are connected in parallel to each other.

The base of the common collector (or emitter follower) transistor Q7 is connected to the collector of transistor Q6. Bias resistor R18 is connected between ground potential GND and a junction node located between the base of transistor Q7 and the collector output terminal of transistor Q6, and supply voltage B+ is applied to the collector of transistor Q7. Resistor R19 is connected between ground potential GND and the emitter of transistor Q7. The emitter of transistor Q7 is also connected to the base of transistor Q4 of differential amplification means 41 via resistor R11.

Automatic luminance controller 60 is connected between a flyback transformer 70 and buffer 50. Namely, the ABL(Auto Beam Limiter) output of the flyback transformer 70 is connected to the base of common collector transistor Q8. Between the emitters of transistors Q8 and Q7 are coupled to each other, and between them voltage distribution resistors R20 and R21 are connected to diode D1.

The base of transistor Q8 is connected to voltage distribution resistors R22 and R24, current control resistor R23 and an alternating-current by-pass capacitor C2.

Figure 1:
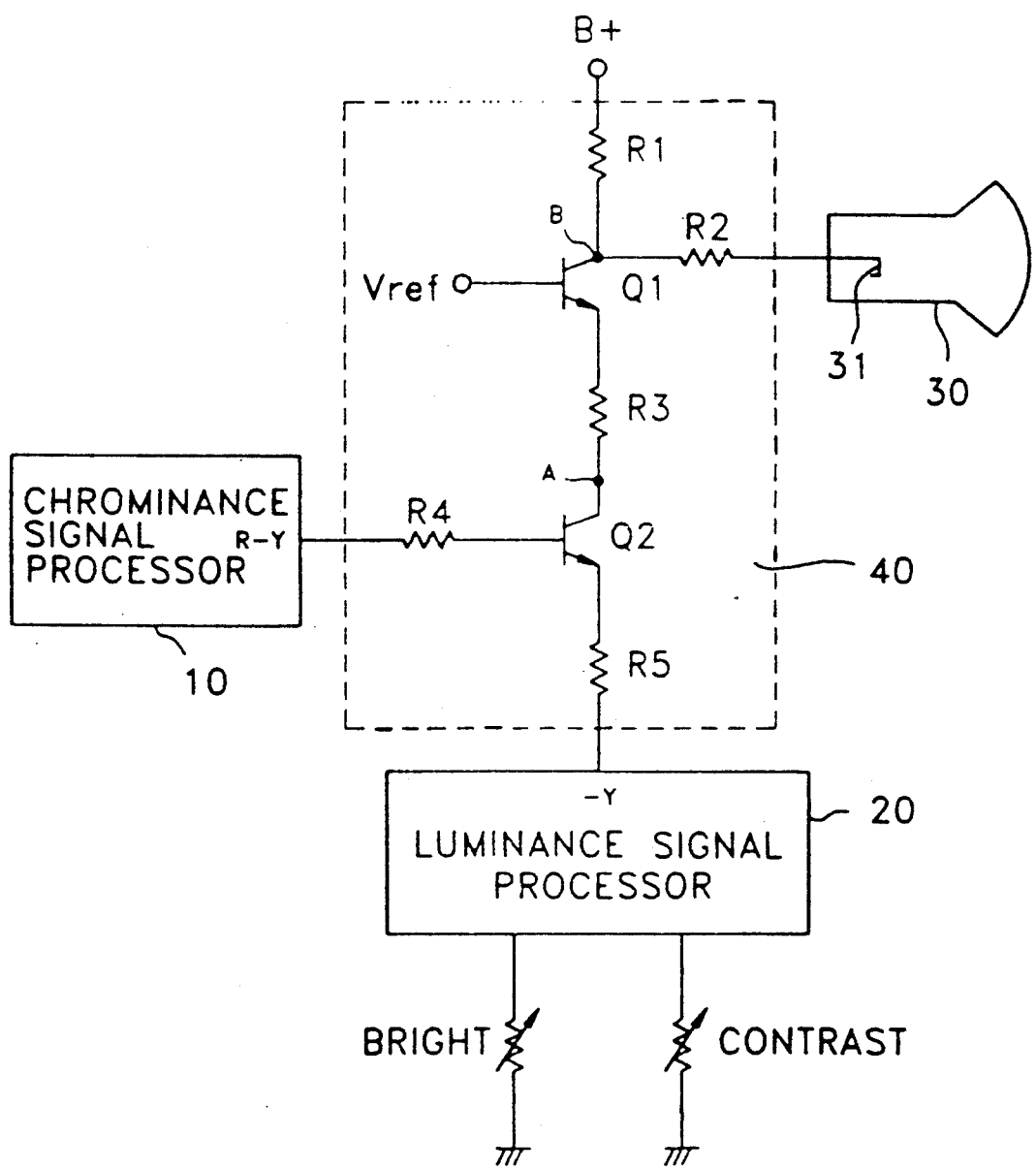
FIG. 1 schematically shows a conventional wide-band cathode-ray tube driving circuit.

In operation of the circuit shown in FIG. 2, color difference signal processor 10 and luminance signal processor 20, operate in the same manner as the operations of those shown in FIG. 1 to generate color difference signal R−Y and negative luminance signal (−Y), respectively.

The output R−Y outputted from color difference signal processor 10 is inputted to the base of transistor Q3 in differential amplification means 41 via resistor R10. On the other hand, negative luminance signal (−Y) outputted from luminance signal processor 20 is applied to the base of transistor Q4 in differential amplification means 41 via buffer means 50 and resistor R11.

The negative luminance signal (−Y) applied to buffer means 50 is applied to the base of transistor Q6, and is then inversely amplified to appear signal in the form of an inverted luminance signal Y at the collector of transistor Q6. At this time, capacitor C1 is used for the purpose of compensating a peaking for preventing any gain turn-down in the vicinity of the high-band cut-off frequency.

The aforesaid inversely amplified luminance signal Y is fed to the base of transistor Q7. The transistor Q7 serves as a buffer to prevent any gain turn-down due to load. Thus, buffer means 50 plays a part in impedance matching so that the applied luminance signal Y can thereby be applied to the base of transistor Q4 in the differential amplification means 41.

In the automatic beam limiter terminal ABL of the flyback transformer 70 (the output transformer for horizontal deflection coil) of automatic luminance controller 60, a voltage of a low logic level is generated if a brightness of an applied image signal is high. If not, that of a high logic level is generated.

Such a signal generated at terminal ABL of the flyback transformer 70, of which alternating current components are removed by capacitor C2 prior to being applied at the base of transistor Q8, is divided by a pair of the voltage distribution resistors R22 and R24 and fed to the base of transistor Q8. The transistor Q8 linearly amplifies the voltage supplied to the base input according to the voltage condition supplied at terminal ABL of the flyback transformer 70 and the voltage emerging at the emitter output varies accordingly.

Furthermore, the voltage of the emitter output of transistor Q8 is first distributed by voltage distribution resistors R21 and R20 and then applied to the emitter of transistor Q7 via one way diode D1. Then by way of controlling a reference level of the luminance signal outputted from the emitter of transistor Q7, the brightness of an image signal is controlled.

The luminance signal Y controlled as above is fed to the base of transistor Q4 of the differential amplification means 41. The means 41 amplifies the difference signal $(-(R-Y)-Y=-R)$ of signals R−Y and (−Y) respectively applied at the bases of the transistors Q3 and Q4 outputting the amplified signal through junction D. At the same time, transistor Q5 controls the overall amount of current flow of transistors Q3 and Q4 so as to control the gain according to the adjustment of the variable resistor R13.

In addition, the difference signal (−R) appearing at the junction D and amplified by both transistors Q3 and Q4 is peaked by inductor L1 and current flow is controlled through resistor R9 and then applied to the cathode image intensity control electrode (not shown) of the CRT. The amplified difference signal (−R) can be, however, applied to the CRT in the form of the original color signal R as shown in FIG. 1 through a buffer (e.g. one consisting of transistor Q1 as shown in FIG. 1) which inverts the phase of the signal prior to being applied to the CRT.

As stated above, the present invention has an advantage of enlarging the high frequency response characteristic to a video signal and the band-width of an amplifier, in the CRT driving circuit of a video signal processing system, by using a differential amplifier which enables an amplification of direct current components and of which bias stability is superior, and operated stably, particularly under a wide range of temperatures and fluctuations of the power supply, so that a screen of higher image quality can thereby be displayed on the cathode-ray tube.

What is claimed is:

1. A wide-band cathode-ray tube driving circuit in a video signal processing system including a color difference signal processor for generating a color difference signal and a luminance signal processor for generating a luminance signal and a cathode-ray tube, said circuit comprising:

differential amplifier means for differentially amplifying said luminance signal and said color difference signal to supply to said cathode-ray tube;

current flow control means for controlling an overall amount of current in a current flowing path of said differential amplifier means;

a two-stage amplifier interposed between said luminance signal processor and said differential amplifier means, for buffering said luminance signal generated from said luminance signal processor, said two-stage amplifier having a base of a first stage amplifier coupled to receive said luminance signal, a collector of said first stage amplifier connected to a base of a second stage amplifier, and an emitter of said second stage amplifier providing said buffered luminance signal; and luminance controller means connected to said emitter of said second stage amplifier, for automatically controlling a reference level of the signal output from said two-stage amplifier according to a brightness level of an image signal.

2. The wide-band cathode-ray tube driving circuit according to claim 1, wherein the information on the brightness level of said image signal is supplied from a flyback transformer.

3. The wide-band cathode-ray tube driving circuit according to claim 1, wherein said current flow control means controls an overall current flow amount of said differential amplifier means by adjusting a variable resistor to control a current gain.

4. The wide-band cathode-ray tube driving circuit according to claim 1, wherein said differential amplifier means is a differential amplifier having a base of a first transistor coupled to receive said color difference signal, a base of a second transistor coupled to receive said signal output from said two-stage amplifier, and a common emitter junction connected to said current flow control means.

5. The wide-band cathode-ray tube driving circuit according to claim 1, wherein said luminance controller means receives said brightness level of the image signal from a flyback transformer.

6. A wide-band cathode-ray tube driving circuit, comprising:

a two-stage amplifier for buffering luminance signals to provide buffered luminance signals at an output terminal, said two-stage amplifier having a base of a first stage amplifier coupled to receive said luminance signals, and an emitter of a second stage amplifier serving as said output terminal;

a luminance controller for automatically controlling an image brightness level of said buffered luminance signals; and a differential amplifier for amplifying said buffered luminance signals and color difference signals to provide amplified signals having selected frequency bandwidths, said differential amplifier having a base of a first transistor coupled to receive said color difference signals, a base of a second transistor coupled to receive said buffered luminance signals, and a common emitter junction connected to a current source for controlling a current gain of said amplified signals.

7. The wide-band cathode-ray tube driving circuit according to claim 6, wherein said current source controls an overall current flow amount of said differential amplifier by adjusting a variable resistor to control said current gain.

8. The wide-band cathode-ray tube driving circuit according to claim 6, wherein said selected frequency bandwidths are approximately from 8 MHz to 20 MHz.

9. A wide-band cathode-ray tube driving circuit, comprising:

buffer means for buffering luminance signals to provide buffered luminance signals at an output terminal, said buffer means having a base of a first amplifier coupled to receive said luminance signals, a collector of said first amplifier connected to a base of a second amplifier, a capacitor interposed between to an emitter of said first amplifier and ground for compensating amplitude peakings of said luminance signals, and an emitter of said second amplifier for serving as said output terminal;

controller means for automatically controlling an image brightness level of said buffered luminance signals; and amplifier means for amplifying said buffered luminance signals and color difference signals to provide amplified signals having selected frequency bandwidths, said amplifier means having a base of a first transistor coupled to receive said color difference signals, a base of a second transistor coupled to receive said buffered luminance signals, a common emitter junction connected to a current source for controlling a current gain of said amplified signals, and a common collector junction for providing said amplified signals at an output terminal.

10. The wide-band cathode-ray tube driving circuit according to claim 9, wherein said current source controls an overall current flow amount of said amplifier means by adjusting a variable resistor to control said current gain.

11. The wide-band cathode-ray tube driving circuit according to claim 9, wherein said selected frequency bandwidths are approximately from 8 MHz to 20 MHz.

12. A wide-band cathode-ray tube driving circuit, comprising;

means for receiving luminance signals and color-difference signals;

buffer means for buffering said luminance signals to provide buffered luminance signals;

controller means directly connected to an output terminal of said buffer means, for automatically controlling an image brightness level of said buffered luminance signals independently from said color-difference signals;

amplifier means for amplifying said buffered luminance signals and said color-difference signals to provide amplified signals having selected frequency bandwidths; and current flow control means for controlling a current gain of said amplified signals from said amplifier means.

13. The wide-band cathode-ray tube driving circuit according to claim 12, wherein said buffer means comprises:

a first stage amplifier having a base coupled to receive said luminance signals, a collector connected to said base via a first resistor, and an emitter connected to ground via a parallel connection of a second resistor and a capacitor; and a second stage amplifier having a base connected to the collector of said first stage amplifier, a collector connected to the base of said first stage amplifier via a second resistor, and an emitter for serving as the output terminal to provide said buffered luminance signals.

14. The wide-band cathode-ray tube driving circuit according to claim 13, wherein said current flow control means controls an overall current flow amount of said amplifier means by adjusting a variable resistor to control said current gain.

15. The wide-band cathode-ray tube driving circuit according to claim 12, wherein said selected frequency bandwidths are approximately from 8 MHz to 20 MHz.

16. The wide-band cathode-ray tube driving circuit according to claim 12, wherein said amplifier means is a differential amplifier having a base of a first transistor coupled to receive said color-difference signals, a base of a second transistor coupled to receive said buffered luminance signals, and a common emitter junction connected to said current flow control means.

* * * * *